US012539087B2

(12) United States Patent
Attia et al.

(10) Patent No.: US 12,539,087 B2
(45) Date of Patent: Feb. 3, 2026

(54) ECG-BASED AGE AND SEX ESTIMATION

(71) Applicant: Mayo Foundation for Medical Education and Research, Rochester, MN (US)

(72) Inventors: Itzhak Zachi Attia, Rochester, MN (US); Paul A. Friedman, Rochester, MN (US); Suraj Kapa, Rochester, MN (US); Francisco Lopez-Jimenez, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 986 days.

(21) Appl. No.: 16/960,236

(22) PCT Filed: Jan. 11, 2019

(86) PCT No.: PCT/US2019/013228
§ 371 (c)(1),
(2) Date: Jul. 6, 2020

(87) PCT Pub. No.: WO2019/140217
PCT Pub. Date: Jul. 8, 2019

(65) Prior Publication Data
US 2021/0361217 A1 Nov. 25, 2021

Related U.S. Application Data

(60) Provisional application No. 62/616,555, filed on Jan. 12, 2018.

(51) Int. Cl.
*A61B 5/361* (2021.01)
*A61B 5/00* (2006.01)
(Continued)

(52) U.S. Cl.
CPC ........ *A61B 5/7267* (2013.01); *A61B 5/02028* (2013.01); *A61B 5/361* (2021.01);
(Continued)

(58) Field of Classification Search
CPC . A61B 5/361; A61B 5/02028; A61B 5/14546; A61B 5/366; A61B 5/7267;
(Continued)

(56) References Cited

U.S. PATENT DOCUMENTS

2002/0183624 A1\* 12/2002 Rowe ..................... B82Y 20/00
600/476
2006/0136744 A1   6/2006 Lange
(Continued)

FOREIGN PATENT DOCUMENTS

WO   WO 2017/091736        6/2017
WO   WO-2017091736 A1 \*   6/2017  ............... A61B 5/00

OTHER PUBLICATIONS

Neuman, M. R. "Biopotential Electrodes." The Biomedical Engineering Handbook: Second Ed. Joseph D. Bronzino; Boca Raton: CRC Press LLC, 2000 (Year: 2000).\*
(Continued)

*Primary Examiner* — Pamela M. Bays
(74) *Attorney, Agent, or Firm* — Caldwell Intellectual Property Law

(57) ABSTRACT

Systems, methods, devices, and other techniques for estimating the age and sex of a person through analysis of an electrocardiogram (ECG) recording for the person. Some aspects include recording an ECG of a person, processing data representing the ECG with an age-estimation neural network to generate an estimated age of the person, and outputting an indication of the estimated age of the person. Other aspects include processing the ECG with a sex prediction neural network to generate a predicted sex of the
(Continued)

person and outputting an indication of the predicted sex of the person.

13 Claims, 16 Drawing Sheets

(51) Int. Cl.
    *A61B 5/02*         (2006.01)
    *A61B 5/366*       (2021.01)
    *G16H 50/20*       (2018.01)
    *G16H 50/30*       (2018.01)
    *A61B 5/117*       (2016.01)

(52) U.S. Cl.
    CPC ............ *A61B 5/366* (2021.01); *A61B 5/7264* (2013.01); *G16H 50/20* (2018.01); *G16H 50/30* (2018.01); *A61B 5/117* (2013.01); *A61B 2560/02* (2013.01)

(58) Field of Classification Search
    CPC ... A61B 2560/02; A61B 5/349; A61B 5/7264; A61B 5/117; G16H 50/20; G16H 50/30; G16H 40/60
    See application file for complete search history.

(56) References Cited

U.S. PATENT DOCUMENTS

2013/0296726 A1* 11/2013 Niebauer ............... A61B 5/287
                                                              600/510
2017/0000366 A1* 1/2017 Gregg ................. A61N 1/3937

OTHER PUBLICATIONS

Attia et al., "Novel Bloodless Potassium Determination Using a Signal-Processed Single-Lead ECG," J. Am. Heart Association, Jan. 25, 2016, 5(1):e002746,.

Attia et al., "Screening for levent ventricular dysfunction using artificial intelligence applied to the 12 lead ECG," Nat. Medicine, Jan. 7, 2019, 25(1):70-74.

Haberman et al., "Wireless Smartphone ECG Enables Large-Scale Screening in Diverse Populations," J. Cardiovasc. Electrophysiology, Mar. 19, 2015, 26(5):520-526.

Holmvang et al., "Very Early Risk Stratification Using Combined ECG and Biochemical Assessment in Patients With Unstable Coronary Artery Disease (A Thrombin Inhibition in Myocardial Ischemia [TRIM] Substudy)," Circulation, Nov. 10, 1998. 98(19):2004-2009.

Hoo-Chang et al., "Deep Convolutional Neural Networks for Computer-Aided Detection: CNN Architectures, Dataset Characteristics and Transfer Learning," IEEE Trans. Med. Imaging, May 2016, 35(5):1285-1298.

Hossain et al., "Identifying Drug (Cocaine) Intake Events from Acute Physiological Response in the Presence of Free-living Physical Activity," Proceedings of the 13th International Symposium on Information Processing in Sensor Networks, Berlin, Germany, Apr. 15-17, 2014, 71-82.

Ioffe et al., "Batch Normalization: Accelerating Deep Network Training by Reducing Internal Covariate Shift," Proceedings of the 32nd International Conference on Machine Learning, Lille, France, Jul. 6-11, 2015, 37:448-456.

Kingma et al., "Adam: A Method for Stochastic Optimization," arXiv, Dec. 22, 2014, arXiv:1412.6980v1, 9 pages.

Kurokawa et al., "Sex hormonal regulation of cardiac ion channels in drug-induced QT syndromes," Pharmacol. Therapeutics, Dec. 2016, 168:23-28.

Kvedar et al., "mHealth advances clinical research, bit by bit," Nat. Biotechnology, Apr. 11, 2017, 35(4):337-339.

Lourenço et al., "Unveiling the Biometric Potential of Finger-Based ECG Signals," Comput. Intell. Neuroscience, Aug. 7, 2011, 2011:720971, 9 pages.

Malik et al., "QT/RR curvatures in healthy subjects: sex differences and covariates," Am. J. Physiol. Heart Circ. Physiology, Oct. 25, 2013, 305(12):H1798-H1806.

Medium.com [online], "MIT Deep Learning Basics: Introduction and Overview with TensorFlow," Feb. 4, 2019, retrieved on May 12, 2021, retrieved from URL<https://medium.com/tensorflow/mit-deep-learning-basics-introduction-and-overview-with-tensorflow-355bed26baf0>, 11 pages.

PCT International Preliminary Report on Patentability in International Application No. PCT/US2019/013228, dated Jul. 23, 2020, 6 pages.

PCT International Search Report and Written Opinion in International Application No. PCT/US2019/013228, dated May 24, 2019, 9 pages.

Pinto et al., "Towards a Continuous Biometric System Based on ECG Signals Acquired on the Steering Wheel," Sensors, Sep. 28, 2017, 17(10):2228.

Salama et al., "Sex differences in the mechanisms underlying long QT syndrome," Am. J. Physiol. Heart Circ. Physiology, Jun. 27, 2014. 307(5):H640-H648.

van Noord et al., "The association of serum testosterone levels and ventricular repolarization," Eur. J. Epidemiology, Dec. 3, 2009, 25(1):21-28.

Voss et al., "High resolution ECG, heart rate variability and non-linear dynamics: tools for high risk stratification," Proceedings of Computers in Cardiology Conference, London, UK, Sep. 5-8, 1993, 261-264.

Zhang et al., "Sex-Steroid Hormones and Electrocardiogramterval Duration: Findings From the Third National Health and Nutrition Examination Survey and the Multi-Ethnic Study of Atherosclerosis," Am. J. Epidemiology, Aug. 15, 2011, 174(4):403-411.

\* cited by examiner

| Comorbidity | Overall (N=100) | ECG estimated age exceeds chronologic age by >7 years (N=49) | ECG estimated within +7 to -7 of chronologic age (N=40) | ECG estimated age is less than chronologic age by >7 years (N=11) | P value |
|---|---|---|---|---|---|
| No comorbidities | 18 (18%) | 0 | 11 (28%) | 7 (64%) | <0.01 |
| Hypertension | 56 (56%) | 36 (73%) | 16 (40%) | 4 (36%) | <0.01 |
| Diabetes | 33 (33%) | 16 (33%) | 17 (43%) | 0 (0%) | 0.03 |
| Low ejection fraction (EF<50%) | 20 (20%) | 19 (39%) | 1 (3%) | 0 (0%) | <0.01 |
| Myocardial infarction | 16 (16%) | 15 (31%) | 1 (3%) | 0 (0%) | <0.01 |
| Atrial fibrillation | 27 (27%) | 22 (45%) | 5 (13%) | 0 (0%) | <0.01 |
| Coronary artery disease | 47 (47%) | 41 (84%) | 6 (15%) | 0 (0%) | <0.01 |
| Any cardiac surgery | 25 (25%) | 25 (51%) | 0 (0%) | 0 (0%) | <0.01 |

FIG. 9

ECG-BASED AGE AND SEX ESTIMATION

CROSS-REFERENCE TO RELATED APPLICATIONS

This application is a National Stage application under 35 U.S.C. § 371 of International Application No. PCT/US2019/013228, having an International Filing Date of Jan. 11, 2019, which claims priority to U.S. Application Ser. No. 62/616,555, filed on Jan. 12, 2018. The disclosure of the prior application is considered part of the disclosure of this application, and is incorporated in its entirety into this application.

BACKGROUND

Electrical activity of the heart can be recorded by an electrocardiogram ("ECG"). Electrocardiograms are obtained by establishing contact between one or more electrodes and the skin or surface of an individual. In a conventional 12-lead ECG, ten electrodes are placed on an individual's chest and limbs in a known configuration, and the electrical potential between twelve pairs of the electrodes are measured and recorded. Each pair of electrodes reflects the electrical activity in a different direction on the individual's body, and are commonly referred to as leads. Some ECG systems capture signals from fewer than 12 leads. For example, patches and other devices have been developed that include just a single electrode, two electrodes, or otherwise fewer than the ten electrodes provided in a 12-lead ECG setup.

SUMMARY

This specification describes systems, methods, devices, and other techniques for estimating the age, sex, or both of a person from analysis of the person's ECG. Through use of machine-learning techniques to train sophisticated models such as deep neural networks, correlations between a person's sex and/or age and heart patterns can be identified, thereby enabling the trained models to estimate a person's sex, age, or both by processing data describing the person's ECG.

In some implementations, the machine-learning model is a neural network. The neural network can be a feedforward neural network, a recurrent neural network, a convolutional neural network, or a neural network system that includes combination of these. The neural network can receive ECG data as inputs and process the ECG data to generate an indication of the person's age, sex, or both. In some implementations, the ECG data represents a relatively short interval of ECG data. For example, the ECG data provided as input to the neural network can be limited to less than 30 seconds of the person's ECG, less than 20 seconds of the person's ECG, less than 15 seconds of the person's ECG, less than 10 seconds of the person's ECG, less than 5 seconds of the person's ECG, or less than 2 seconds of the person's ECG. The ECG data can include data for one, two, three, four, or more leads.

In some implementations, the neural network is configured to output an indication of a person's age group. For example, the neural network may be a classifier that classifies a person's age into one of a set of pre-defined age intervals based on the person's ECG data, such as intervals of 18-25 years, 25-35 years, 35-45 years, and so on. In some implementations, the neural network is configured to output an indication of the user's precise numerical age, e.g., a score that indicates a 23.4 years old+/−0.5 years. A separate neural network can be trained to output an estimation of a person's sex, or the same neural network can be configured to output estimations/predictions of both the person's sex (e.g., male/female) and age.

The neural network can be implemented on a system of one or more computers in one or more locations. In some implementations, the neural network is implemented on a user device such as a smartphone, tablet computing device, desktop computer, or smartwatch. The device can include or be communicatively coupled to one or more ECG electrodes. In some implementations, the ECG electrodes are integrated in the device, such as on the housing of a smartphone or the body or wristband of a smartwatch.

In some implementations, the system can receive input indicating a person's true age and/or sex (e.g., as reported or self-identified by that person). The system can record the person's ECG, process the resulting ECG data with a neural network, and determine an estimated age and/or sex for the person. The system can then compare the person's true age and/or sex with the estimated age and/or sex for the person. The system can then use the result of the comparison to perform operations such as continuously refining/re-training the neural network. In some implementations, the comparison can be used to identify specific outcomes for the patient such as cardiovascular risk factors. In some implementations, the patient can be provided his or her estimated age as an estimated "heart," "cardiac," or "physiologic" age to provide an indication of the patient's general heart health. For example, a 35-year old patient with an estimated 50-year old heart may be incented to change lifestyle habits to improve heart health and lower the estimated age. In some implementations, the system can include a fitness or wellness application that adjusts a personalized fitness or wellness program for the patient based at least in part on the person's estimated age determined based on the ECG data.

Some aspects of the subject matter described herein include a method. The method can include recording an electrocardiogram (ECG) of a mammal; processing, with an age-estimation neural network, data representing the ECG of the mammal to generate an estimated age of the mammal; and outputting an indication of the estimated age of the mammal.

These and other can, in some implementations, include one or more of the following features.

The age-estimation neural network can be a convolutional neural network.

The convolutional neural network can include spatial and temporal extraction layers.

The data representing the ECG of the mammal can be a fixed-length representation of the ECG for one or more ECG channels.

The data representing the ECG of the mammal can include a plurality of ECG channels, each ECG channel containing measurements for a corresponding lead of the ECG.

The method can include obtaining an indication of a chronologic age of the mammal, comparing the estimated age of the mammal and the chronologic age of the mammal to determine an estimated-chronologic age difference; and based on the estimated-chronologic age difference, determining whether to invoke a second ECG-based estimation process using the ECG of the mammal. In response to determining that the estimated-chronologic age difference meets a pre-defined threshold, an alert can be generated to flag the estimated-chronologic age difference. The alert can be to prompt a user to check a setup of an ECG recording system that was used to obtain the ECG of the mammal. In some examples, in response to determining that the estimated-chronologic age difference meets a pre-defined threshold, the second ECG-based estimation process can be invoked including providing data representing the ECG of the mammal to a model that is trained to predict a second attribute of the mammal from the data representing the ECG of the mammal, the second attribute being different from the age of the mammal. The second attribute can be a cardiac ejection fraction of the mammal, a level of an analyte in a bloodstream of the mammal, or an arrhythmia condition of the mammal. In response to determining that the estimated-chronologic age difference does not meet a pre-defined threshold, the method can determine not to invoke the second ECG-based estimation process.

The ECG of the mammal can be a first segment of an ECG of a mammal and the estimated age of the mammal can be a first estimated age of the mammal that is based on processing data representing the first segment of the ECG of the mammal.

The method can further include obtaining a second segment of the ECG of the mammal; processing, with the age-estimation neural network, data representing the second segment of the ECG of the mammal to generate a second estimated age of the mammal; comparing the first estimated age of the mammal to a chronologic age of the mammal to determine a first estimated-chronologic age difference; comparing the second estimated age of the mammal to the chronologic age of the mammal to determine a second estimated-chronologic age difference; discarding the first segment of the ECG of the mammal based on the first estimated-chronologic age difference, so that the first segment is not used in a second ECG-based estimation process; and providing the second segment of the ECG of the mammal for use in the second ECG-based estimation process based on the second estimated-chronologic age difference.

The method can further include processing, with the age-estimation neural network, the data representing the ECG of the mammal to generate a confidence score that indicates a level of confidence in the estimated age of the mammal.

Processing the data representing the ECG of the mammal to generate the estimated age of the mammal can include processing only the data representing the ECG of the mammal to generate the estimated age of the mammal, so that the estimated age of the mammal is determined based on the data representing the ECG of the mammal and independent of other information about the mammal.

The data representing the ECG of the mammal can include at least one of (i) values for quantized samples of the ECG of the mammal over a period of time or (ii) values for morphological features of the ECG.

Some aspects of the subject matter described herein include a method for predicting the sex of a mammal. The method can include recording an electrocardiogram (ECG) of a mammal; processing, with a sex-prediction neural network, data representing the ECG of the mammal to generate a predicted sex of the mammal; and outputting an indication of the predicted sex of the mammal.

The sex-prediction neural network can be a convolutional neural network.

Some aspects of the subject matter described herein include non-transitory computer-readable media having instructions stored thereon that, when executed by data processing apparatus, cause the data processing apparatus to perform any of the methods disclosed herein. Some aspects of the subject matter described herein include a system having a data processing apparatus and one or more computer-readable media having instructions stored thereon that, when executed by the data processing apparatus, cause the data processing apparatus to perform any of the methods disclosed herein.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other reference mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a table depicting distribution of pre-existing comorbidities for 100 patients with ECGs over decades.

DETAILED DESCRIPTION

This specification generally describes systems, methods, devices, and other techniques for estimating an age and predicting the sex of a person using neural networks or other machine-learning models.

Figure 1A:
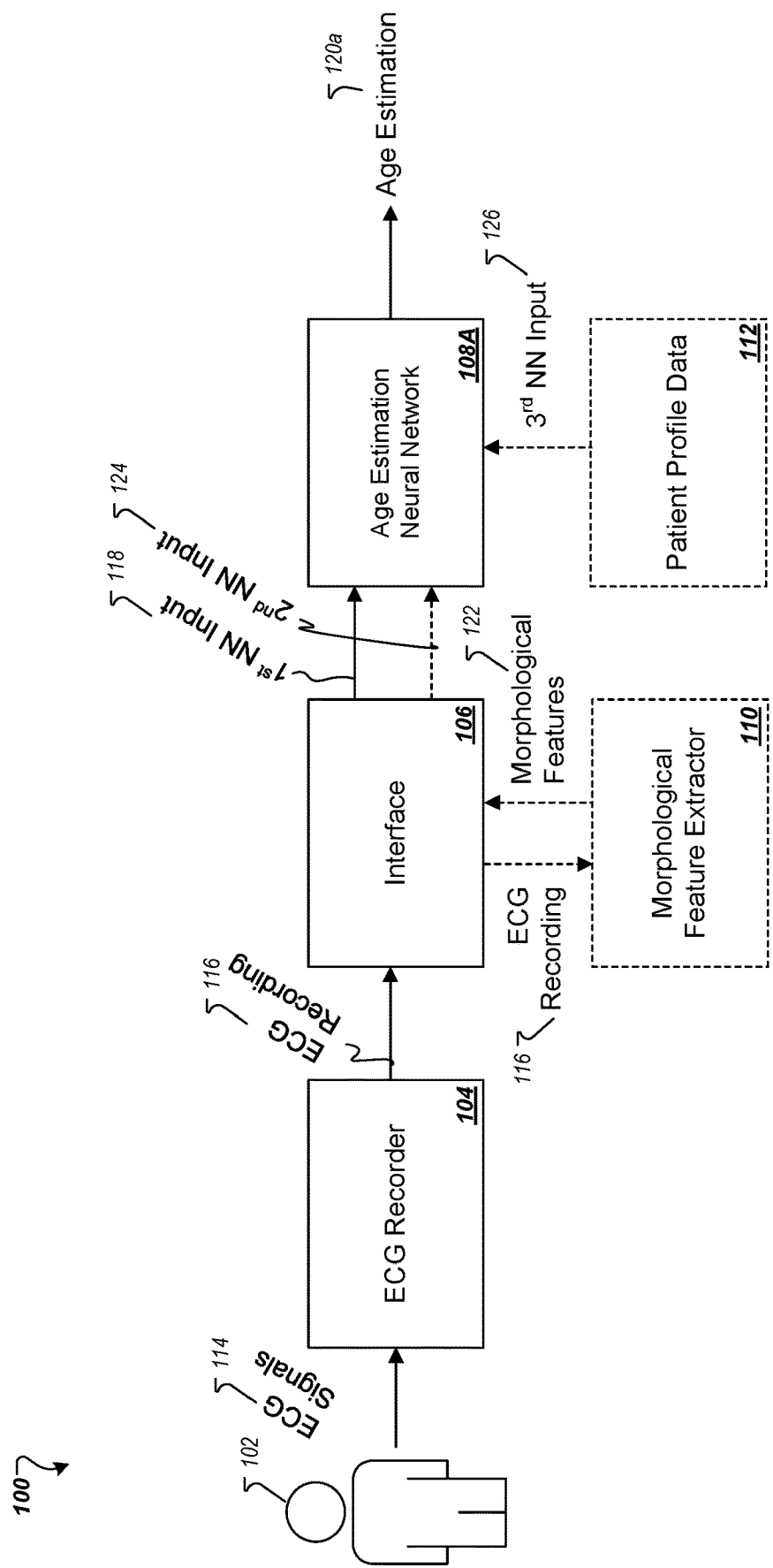
FIG. 1A is a diagram of an example system for ECG recording and ECG-based age estimation.

Referring to FIG. 1A, a diagram is shown of an example system 100 for recording an ECG signal, and for estimating an age of a patient 102 based on the ECG signal. The system 100 is configured to record an ECG of a patient 102 and to process the recording and, optionally, additional (auxiliary) data to generate an age estimation 120a.

The patient 102 can be a human or any other mammal for which an age estimation is desired. To obtain an ECG recording of the patient 102, one or more electrodes are brought into contact with a surface of the patient's body. The electrodes can be arranged according to a standard 12-lead ECG configuration, or in other known configurations. The electrodes may or may not be affixed to the patient 102. In some implementations, fewer than 12-leads are provided to obtain the ECG. For example, a single-lead smartphone-based ECG sensor may be employed to sense the patient's ECG based on finger contact, or a patch with an electrode array may be affixed to the patient's chest.

The ECG recorder 104 includes hardware and/or software for sensing and capturing ECG signals 114 from the electrodes in contact with the patient 102. For example, the signals 114 may be filtered, amplified, and digitally sampled by a ECG recorder 104, and a ECG recording 116 can be generated that represents the patient's ECG for each available lead over a period of time. Typically, the recording 116 may be made based on a relatively short period of measurement. For example, a relatively short sample corresponding to just a few beats may be all that is required to be captured for purposes of making a prediction or diagnosis. In some implementations, a minimum recording time may be specified that is less than or equal to ten minutes, five minutes, one minute, forty-five seconds, thirty seconds, fifteen seconds, ten seconds, or five seconds. The ECG can be recorded while the patient 102 is in the supine position or other positions that correspond to positions of the patients whose ECGs were used as training examples for the system.

An interface 106 can be implemented on a computer or other data processing apparatus. The interface 106 receives a digitized ECG recording 116 from the ECG recorder 104 and processes the recording 116 to generate a first neural network input 118. The first neural network input 118 is a representation of the ECG recording that is suitable for processing by an age estimation neural network 108a. The first neural network input 118, for example, can identify values of the ECG signal level for each lead over the full recording time or over a subset of the recording time (e.g., a time interval that corresponds to a single heartbeat). The first neural network input 118 can represent the ECG recording for one or more individual beats or can represent an averaged beat based on ECG recordings from several measured beats.

Figure 1B:
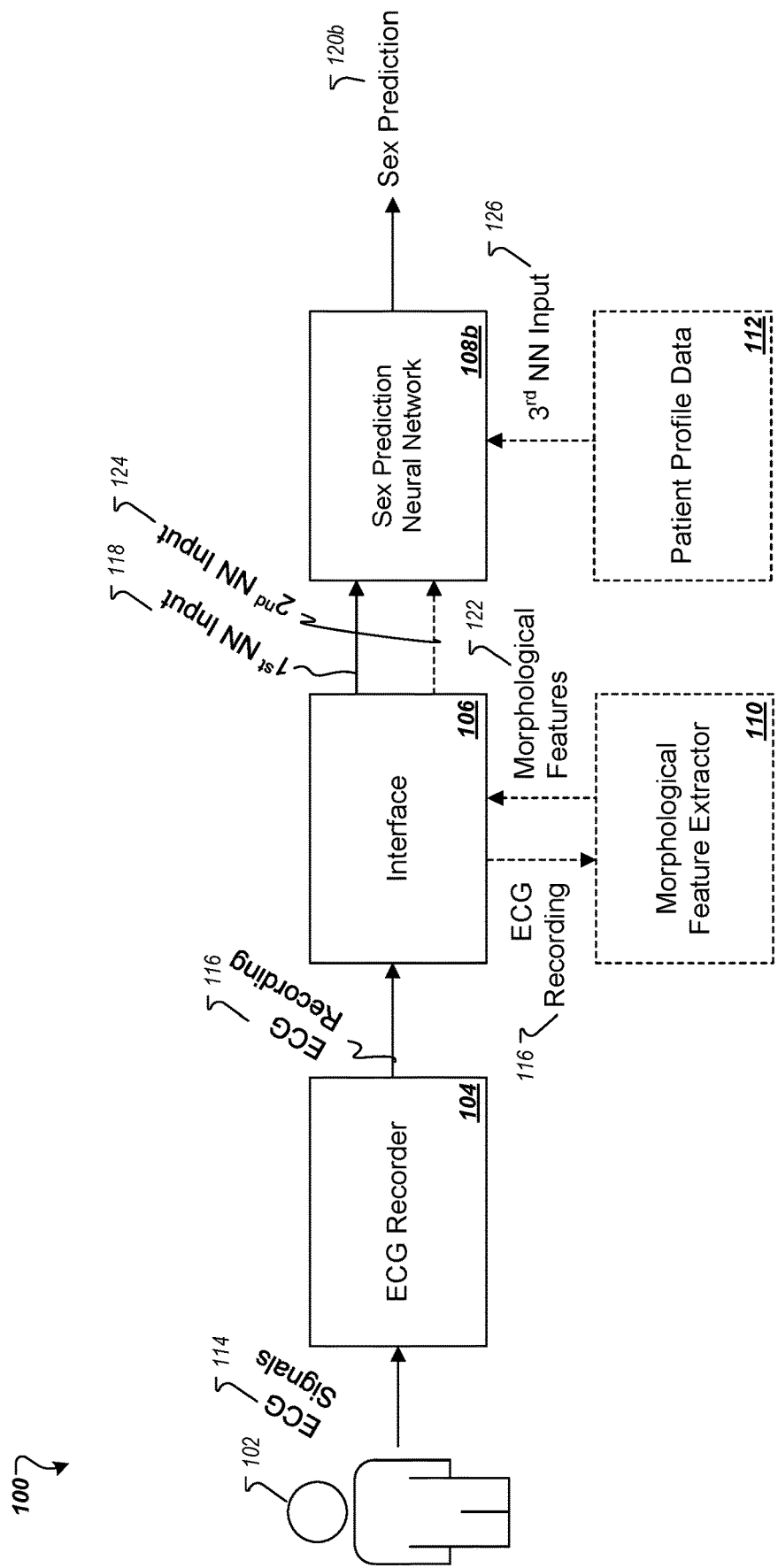
FIG. 1B is a diagram of an example system for ECG recording and ECG-based sex prediction.

The age estimation neural network 108a is configured to process the first neural network input 118 to generate age estimation 120a based on the first neural network input 118. The neural network 108 can include multiple layers of operations that have been trained to estimate an age of the patient 102 based on ECG recordings. In an alternative implementation, as illustrated in FIG. 1B, the system 100 can employ a sex prediction neural network 108b to process the same inputs as the age estimation neural network 108a but to generate a sex prediction 120b (e.g., indicating a male/female prediction) rather than an age estimation 120a. The neural networks 120a, 120b can have the same or different architectures.

Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer. Each layer of a neural network specifies one or more transformation operations to be performed on input to the layer. Some neural network layers have operations that are referred to as neurons. Often, each neuron can receive one or more inputs and generates an output that is received by another neural network layer. The transformation operations of each layer can be carried out by one or more computers at one or more locations having installed software modules that implement the transformation operations.

The neural networks 108a, 108b can be feedforward neural networks, recurrent neural networks, convolutional neural networks capsule networks, or may include various portions having different characteristics, such as feedforward layers, recurrent layers, and/or convolutional layers.

The networks 108a, 108b can be implemented on one or more computers or other data processing apparatus in one or more locations. The networks 108a, 108b may be implemented on a smartphone or other personal device (e.g., tablet, desktop or notebook computer) in the same location as the patient 102, or may be implemented on one or more remote servers in communication with the interface 106.

In some implementations, the neural networks 108a, 108b are configured to process additional (auxiliary) information in generating age estimation 120a or sex prediction 120b. For example, the networks 108a, 108b may process a second neural network input 124 in addition to the first neural network input 118 to generate outputs 120a or 120b, respectively.

Figure 3:
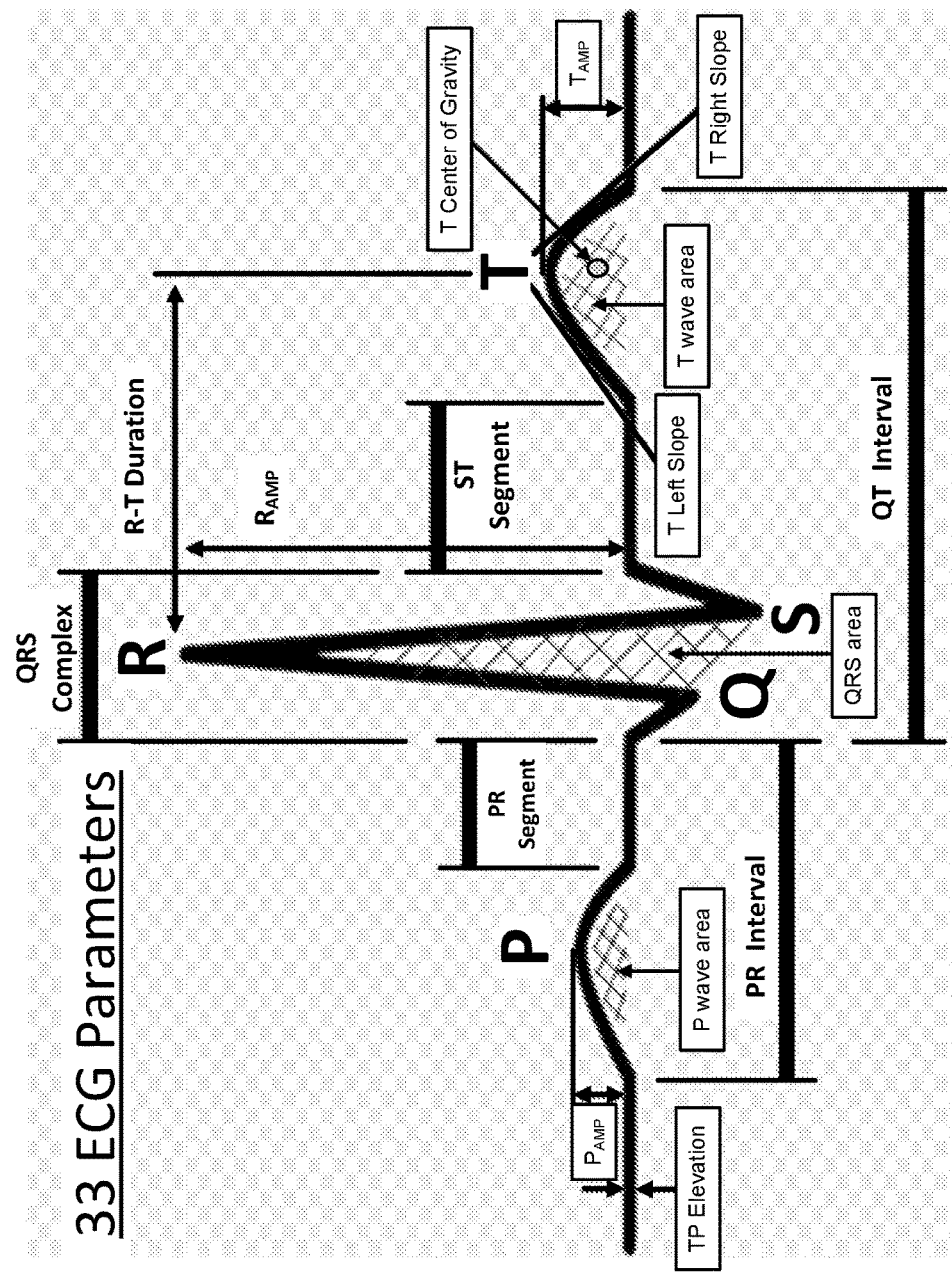
FIG. 3 is an example diagram of a segment of an ECG recording for a mammal depicting various morphological features of the ECG.

In some implementations, the second neural network input 124 represents morphological features 122 of the patient's ECG. FIG. 3, for instance, depicts a waveform or tracing 300 for a single beat from a patient's ECG. The waveform includes several segments including a P-wave, a QRS-complex, and a T-wave. The interface 106 can provide the ECG recording 116 to a morphological feature extractor 110 for analysis, and the extractor 110 can measure various morphological features 112 of one or more beats (or a composite or averaged beat) from the ECG recording 116. The morphological features 112 are parameters that describe attributes of the shape of the beat, including attributes of individual segments of the beat and attributes between segments. A number of morphological features that may be employed for age or sex prediction are labeled in FIG. 6, such as a duration of the QRS-complex, am amplitude of the P-wave, R-wave, or T-wave, an area of the P-wave, QRS-complex, or T-wave, slopes of any of the waves, distances between the waves, and centers-of-gravity of the waves. The morphological feature extractor 110 provides values for the morphological features 122 to the interface 106, and the interface 106 formats them into an acceptable form for processing by neural networks 108a, 108b as second neural network input 124. The neural networks 108a, 108b process the first and second inputs 118, 124 to generate estimated age 120a or predicted sex 120b.

In some implementations, the neural network 108 processes one or more third neural network inputs 126 representing patient profile data from a database 112. The patient profile data is another form of auxiliary information, and in particular it indicates non-ECG descriptions of the patient 102. For example, for sex prediction, the patient profile data may contain indications of the patient's age and weight, and for age estimation, the patient profile data may contain indications of the patient's sex or other attributes. The neural networks 108 can process the first neural network input 118 and none, one, or both of second neural network input 124 and third neural network input 126 to generate the age estimation 120a or sex prediction 120b, respectively.

Figure 2:
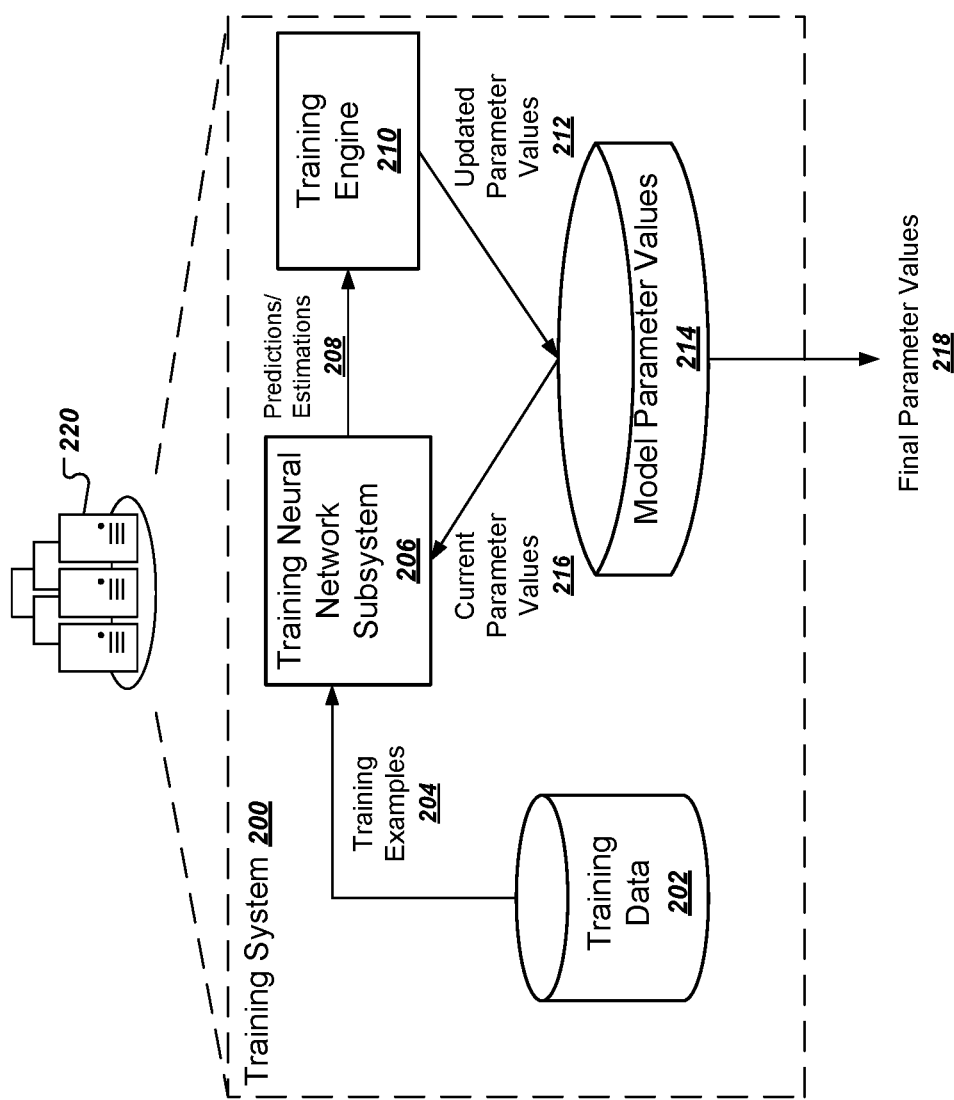
FIG. 2 depicts an example system for training an age estimation and/or sex prediction neural network.

FIG. 2 depicts an example system 200 for training an age estimation or sex prediction neural network. The training system 200 can be hosted within a data center 220 which can be a distributed computing system having hundreds or thousands of computers in one or more locations.

The training system 200 includes a training neural network subsystem 206 that can implement the operations of each layer of a neural network that is designed to make an age or sex prediction 120 from ECG recordings and, optionally, auxiliary information such as morphological features and patient profile data. The training neural network subsystem 206 includes a plurality of computing devices having software or hardware modules that implement the respective operations of each layer of the neural network according to an architecture of the neural network. Generally, the training neural network subsystem 206 has the same architecture as the networks 108a or 108b. However, the training system 200 need not use the same hardware to compute the operations of each layer. In other words, the training system 200 can use CPUs only, highly parallelized hardware, or some combination of these.

The training neural network subsystem 206 can compute the operations of each layer of the training neural network subsystem 206 (or the networks 108a, 108b) using current parameter values 216 stored in a collection of model parameter values 214. Although illustrated as being logically separated, the model parameter values 214 and the software or hardware modules performing the operations may actually be located on the same computing device or on the same memory device.

The training neural network subsystem 206 can generate, for each training example 204, an age estimation 208 or a sex prediction 208. A training engine 210 analyzes the estimations/predictions 208 and compares them to labels in the training examples 204 that indicate target ages or sexes of the patients in the training database. The training engine 210 then generates updated model parameter values 214 by using an appropriate updating technique, e.g., stochastic gradient descent with backpropagation. The training engine 210 can then update the collection of model parameter values 214 using the updated model parameter values 212. For example, each training example 204 can include a first component representing a single- or multi-lead ECG recording of a patient and a label indicating a target age or sex. The first component can represent an ECG of a patient, and the label can indicate whether that particular patient's true or reported age or sex, respectively depending upon which network 108a or 108b is being trained. In some implementations, the system can curate the training data by selecting samples for a population of patients that, on average, have a distribution of health conditions that reflect a corresponding distribution in the general population (or within the population for a particular demographic that the networks are being trained for). In this way, the training data can avoid artificially skewing from the norms of the population.

Figure 4:
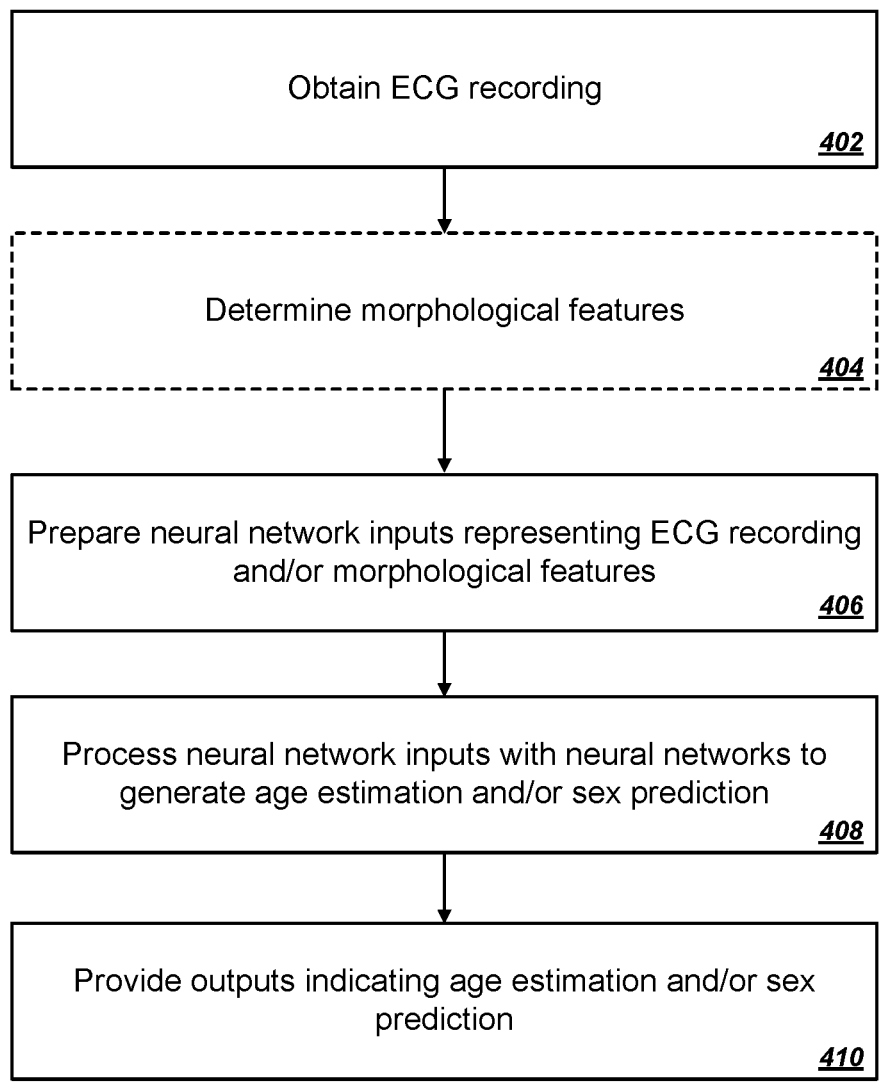
FIG. 4 is a flowchart of an example process for processing ECG data with a neural network to generate an age estimation, a predicted sex, or both for a mammal.

FIG. 4 is a flowchart of an example process 400 for processing ECG data with a neural network (e.g., an age estimation neural network, sex prediction neural network, or both) to generate an age estimation, a predicted sex, or both for a patient (or other person of interest or other tm. A system obtains an ECG recording for the patient (402). The ECG recording can include one or more channels corresponding to one or more leads of an ECG. The ECG recording can be sampled and quantized to provide digital samples representative of an amplitude of the ECG for each of the channels at each sampling time. In some implementations, the ECG recording is a 12-lead ECG recording. In other implementations, fewer leads may be employed (e.g., 1, 2, 3, or 4 leads). Optionally, the system can analyze the ECG recording to determine values for one or more morphological features of the ECG (404). Neural network inputs are prepared from the ECG recording, which can include denoising the ECG recording, normalizing the ECG recording, and formatting the ECG recording to a fixed length representing a limited time interval for the recording (e.g., 1, 2, 5, 10, 15, 20, 25, or 30 seconds). Optionally, the neural network inputs can include values representative of the morphological features from one or more beats in the recording. The neural network inputs are provided to and processed by an age estimation neural network to generate an age estimation for the patient, a sex prediction neural network to generate a sex prediction for the patient, or both (or to a single neural network that provides corresponding outputs for age estimation and sex prediction). The system outputs indications of the age estimation and/or sex prediction. For example, the outputs can be presented for display to a patient or a healthcare provider. The outputs can also be stored and logged in the patient's healthcare record.

Figure 5:
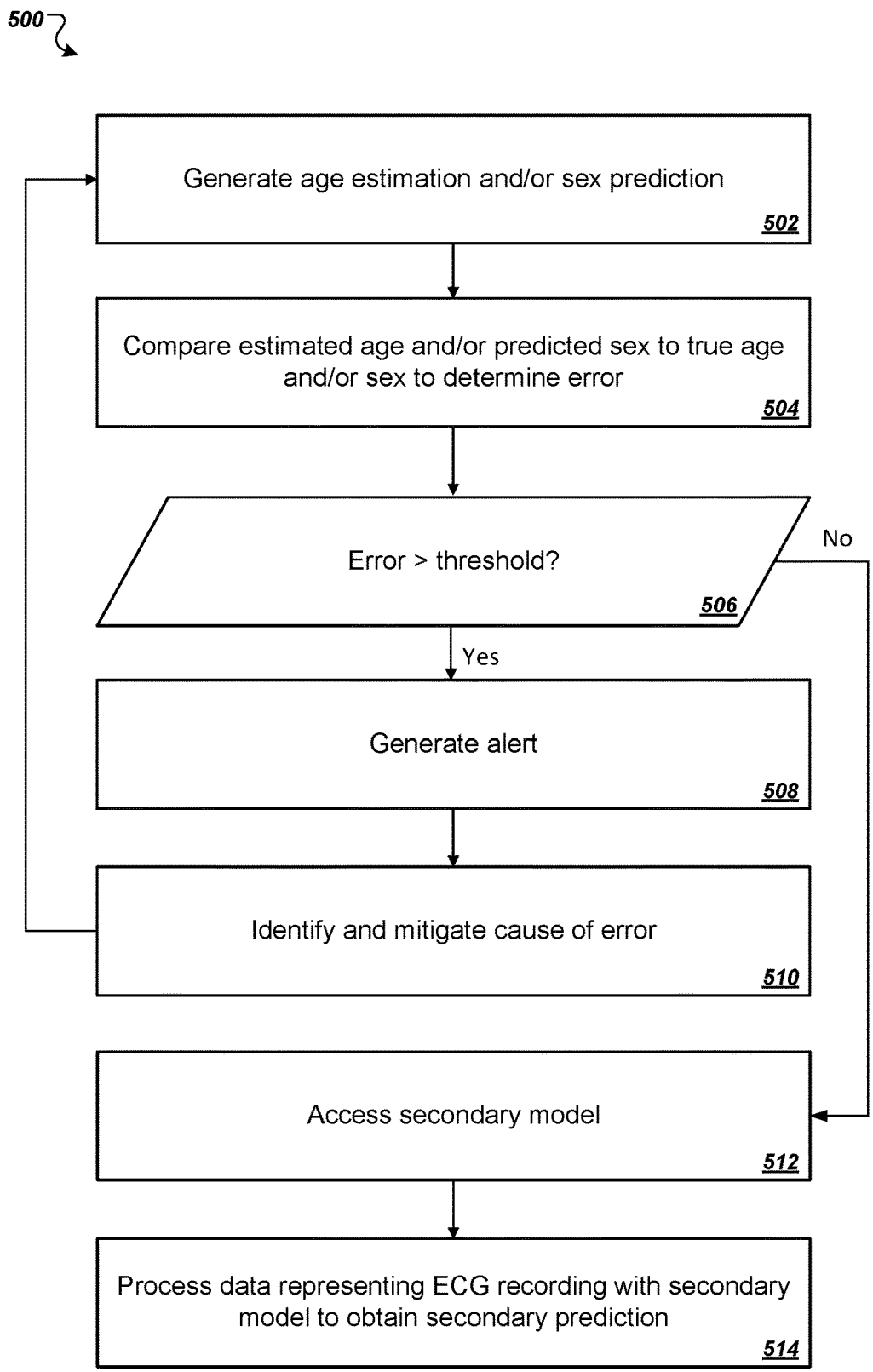
FIG. 5 is a flowchart of an example process for determining whether to invoke a secondary ECG-based estimation process based on results of a first ECG-based age estimation or sex prediction.

FIG. 5 is a flowchart of an example process 500 for determining whether to invoke a secondary ECG-based estimation process based on results of a first ECG-based age estimation or sex prediction. The system generates an age estimation and/or sex prediction by processing ECG data for a patient, e.g., according to the process 400 depicted in FIG. 4 (502). The estimated age and/or predicted sex is compared to a true age and/or sex of the patient to determine a difference (error) between a true age and/or sex of the patient (504). The true age and/or sex of the patient are values that are accepted as the chronologic age (e.g., an actual number of years since birth of the patient) and the sex of the patient, respectively. The true age and sex of the patient can be self-reported or identified by the patient in some implementations. The system can compare the error in the estimated age and/or the error in the predicted sex to a pre-defined threshold (or corresponding thresholds for age and sex) (506). If the error meets (e.g., exceeds) the threshold, the system can generate an alert to flag the error so that a user is notified (e.g., through a display device or speaker) (508). In some cases, a large error between the estimated age or predicted sex and true age or sex can reflect a problem in the ECG recording system such as a faulty contact between one or more electrodes and the patient. The cause of the error can be investigated and remedied (510), and the process 500 returns to stage 502 to obtain a new ECG recording and generate new age estimations and/or sex predictions based on the new ECG recording. If the error does not meet a threshold, the system can invoke a second process to estimate a condition of the patient based on the ECG data. For example, the system may access a secondary model (e.g., a neural network that has been trained to estimate an ejection fraction, arrhythmia condition, or level of an analyte in a patient's bloodstream based on neural network inputs that represent an ECG of a patient) (512). The secondary model can process the patient's ECG data to generate a secondary prediction about the patient. The secondary prediction is generally a prediction about a condition of the patient other than an age estimation or sex prediction. Because age estimation and/or sex prediction are easily validated, such estimations/predictions can thus be employed as a screening tool to assess the reliability or quality of an ECG and the likelihood that the ECG can be successfully processed to generate a high-confidence secondary estimation/prediction. In some implementations, by first screening a patient's ECG with an age estimation or sex prediction model before executing the secondary process, the system may conserve computational expense and/or network bandwidth associated with executing the secondary process since the secondary process can be avoided if a problem is detected through initial screening with the age estimation and/or sex prediction models. For example, a device may first perform age estimation and/or sex prediction using local models stored on the user's device. If results of the age estimation and/or sex prediction satisfy one or more criteria, the system may then access one or more remote models or transmit the ECG data over a network to one or more models for further processing.

Figure 6:
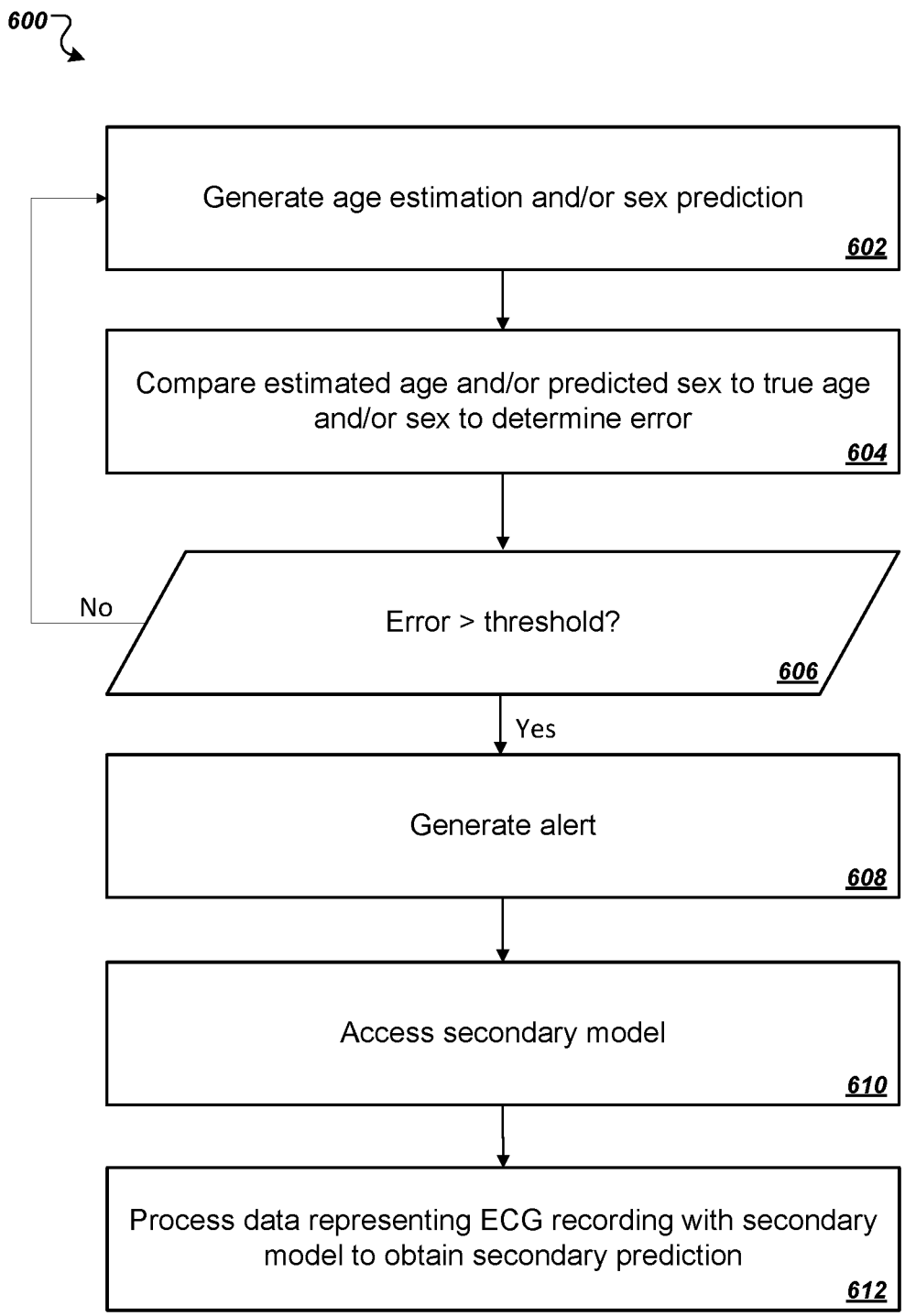
FIG. 6 is a flowchart of a further example process for determining whether to invoke a secondary ECG-based estimation process based on results of a first ECG-based age estimation or sex prediction.

FIG. 6 is a flowchart of a further example process 600 for determining whether to invoke a secondary ECG-based estimation process based on results of a first ECG-based age estimation or sex prediction. The system generates an age estimation and/or sex prediction by processing ECG data for a patient, e.g., according to the process 400 depicted in FIG. 4 (602). The estimated age and/or predicted sex is compared to a true age and/or sex of the patient to determine a difference (error) between a true age and/or sex of the patient (604). The true age and/or sex of the patient are values that are accepted as the chronologic age (e.g., an actual number of years since birth of the patient) and the sex of the patient, respectively. The true age and sex of the patient can be self-reported or identified by the patient in some implementations. The system can compare the error in the estimated age and/or the error in the predicted sex to a pre-defined threshold (or corresponding thresholds for age and sex) (606). If the error meets (e.g., exceeds) the threshold, the system can generate an alert to flag the error so that a user is notified (e.g., through a display device or speaker) (608). Additionally, the system can invoke a second process to estimate a condition of the patient based on the ECG data. For example, the system may access a secondary model (e.g., a neural network that has been trained to estimate an ejection fraction, arrhythmia condition, or level of an analyte in a patient's bloodstream based on neural network inputs that represent an ECG of a patient) (610). The secondary model can process the patient's ECG data to generate a secondary prediction about the patient (612). In this example, ECG-based age estimation and/or sex prediction is employed to invoke a secondary prediction process when there is a significant discrepancy between the estimated values of the patient's age and/or sex and the accepted values of the patient's age and/or sex. The threshold employed in this process 600 may be the same or different from the threshold employed in the process 500 described with respect to FIG. 5. A large discrepancy or error between the estimated or true values may, for example, indicate a condition of the patient that warrants further investigation by way of a secondary prediction process.

Figure 7:
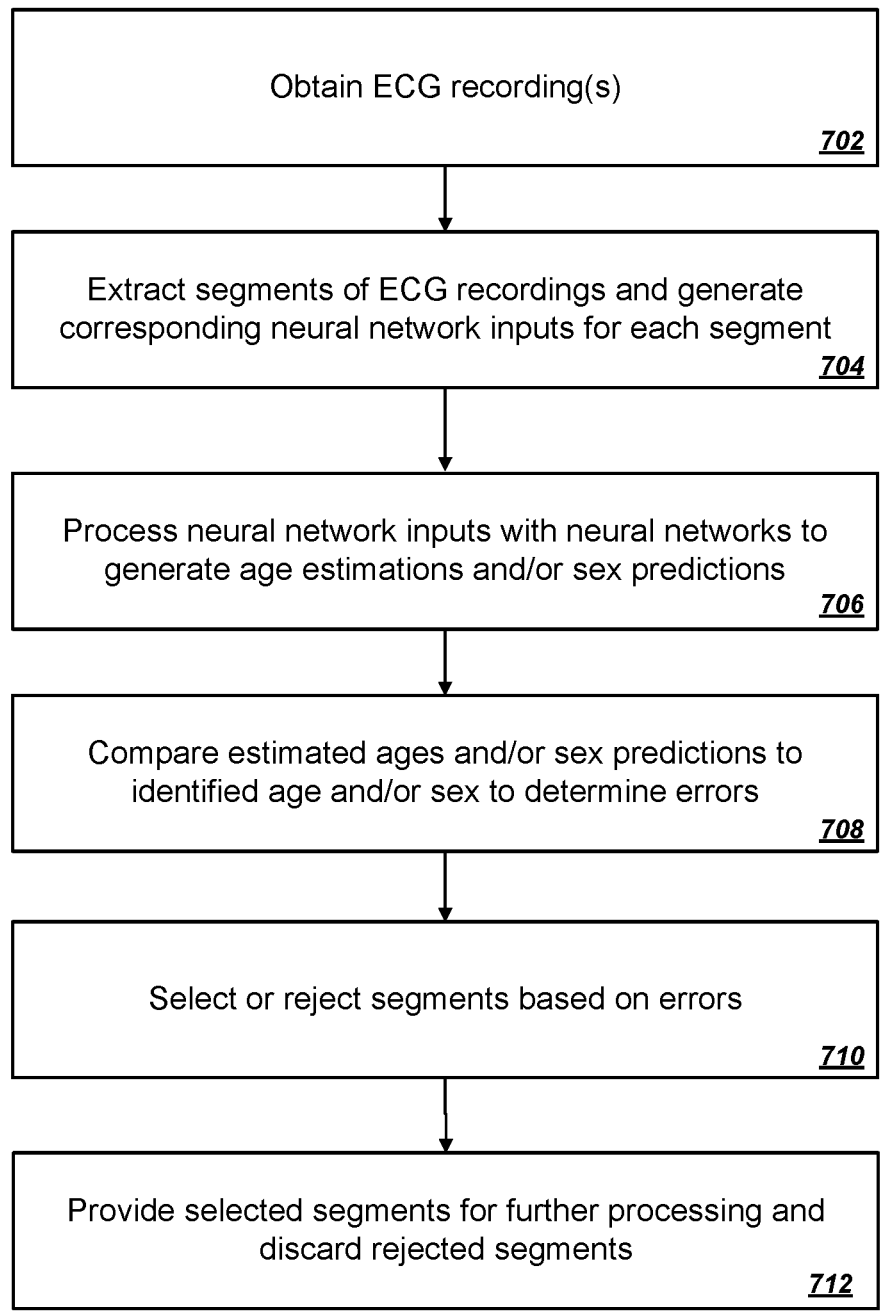
FIG. 7 is a flowchart of an example process for assessing the quality of ECG segments based on results of an ECG-based age estimation or sex prediction.

FIG. 7 is a flowchart of an example process 700 for assessing the quality of ECG segments based on results of an ECG-based age estimation or sex prediction. The system obtains one or more ECG recordings of a patient (702). Segments of the ECG recording(s) are extracted (e.g., fixed-length segments that each span one or more beats of the patient) corresponding to different portions of the recording (s), and the system formats the segments so as to form respective neural network inputs for each segment (704). The system processes the neural network inputs for each segment with at least one of an age estimation neural network or a sex prediction neural network to generate, for each segment, a corresponding age estimation, sex prediction, or both for the patient (706). The age estimation, sex prediction, or both for each ECG segment can be compared to the true (e.g., chronologic) age and reported sex of the patient to determine errors for each segment (708). In some examples, the errors can broadly reflect the quality of each ECG segment, such that higher quality segments having less noise are more likely to produce smaller errors than lower quality segments that are infected with greater levels of noise. The system can then accept or rejects particular ECG segments based on their corresponding age and/or sex estimation errors. For example, ECG segments that produced age and/or sex estimations having errors above a pre-defined threshold may be rejected in favor of other segments that produced age and/or sex estimations having errors lower than the threshold. The rejected segments may be discarded, while one or more of the accepted segments may be designated for use in a secondary (subsequent) ECG-based prediction process (712).

Figure 8:
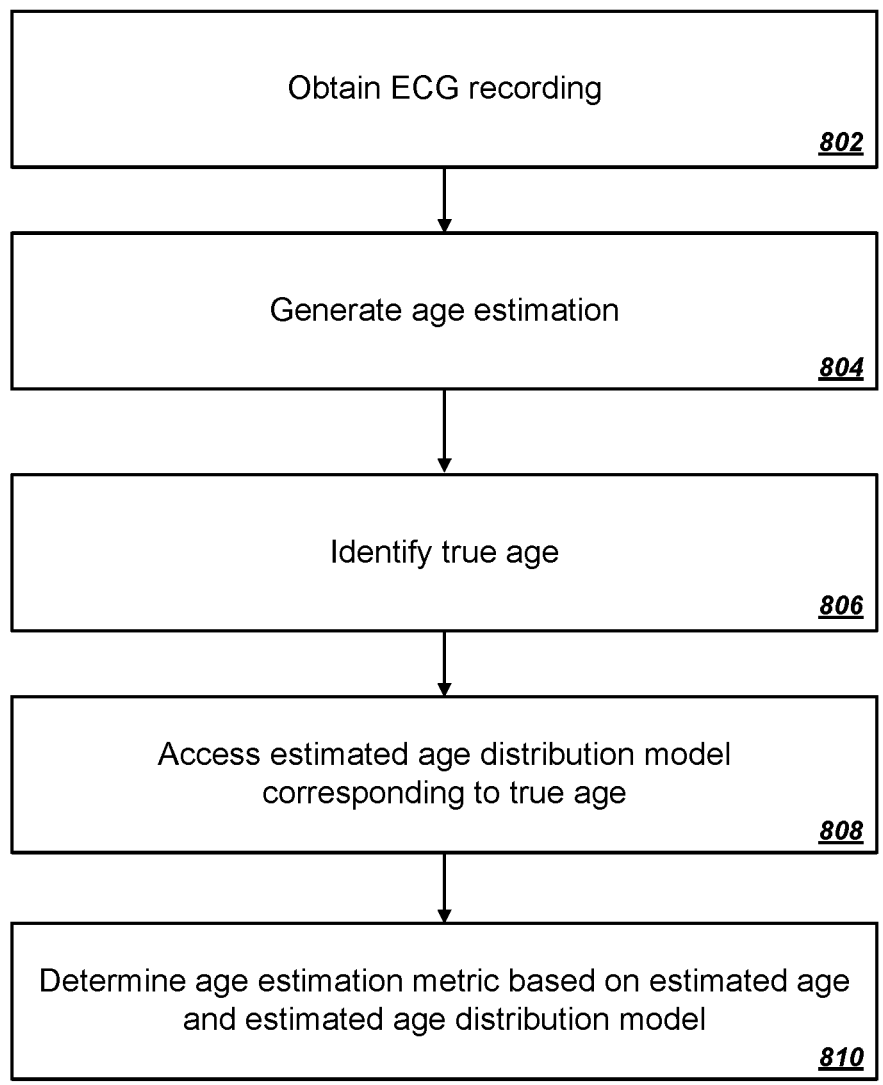
FIG. 8 is a flowchart of an example process for determining an age estimation metric based on ECG data for a mammal.

FIG. 8 is a flowchart of an example process 800 for determining an age estimation metric based on ECG data for a mammal. The age estimation metric may, for example, express a person's estimated age not in terms of an absolute number of years (or other time unit), but rather as a metric relative to other persons in a same or similar demographic as the first person. In some implementations, the age estimation metric is a percentile. For example, a person whose estimated age is in the $70^{th}$ percentile relative to others having the same true or chronologic age may indicate that the person has a higher cardiac or physiological age than 70-percent of others in the same demographic (e.g., others having the same true or chronologic age). The percentile age metric may thus serve as a general indicator of the person's health relative to other similarly situated persons (e.g., persons of the same age). To determine the age estimation metric, a system can obtain an ECG recording of a patient (802), generate an age estimation by processing ECG data with an age estimation neural network (804), identify a true or chronologic age of the patient (806), access an estimated age distribution model corresponding to the true or chronologic age of the patient (808), and evaluate the estimated age distribution model using the estimated age of the patient (810). For example, the system can maintain a set of estimated age distribution models for each age or demographic category, and can determine a percentile for the patient's estimated age by processing the estimated age with the particular distribution model that corresponds to the patient's estimated age.

Example #1—Study Methods and Results, and Corresponding Implementations

This example pertains to a study that hypothesized that a convolutional neural network could be trained through a machine learning (e.g., deep learning) process to predict a person's age and gender using only 12 lead ECG signals. The study further hypothesized that discrepancies between the ECG calculated (e.g., estimated or predicted) age and the person's chronological age may serve as a physiologic measure of health.
Methods
In this study, convolutional neural networks were trained using ten-second samples of 12 lead ECG signals from 499,727 patients from the Mayo Clinic digital data vault to predict gender and age. The networks were then tested on a separate cohort of 275,056 patients. In contrast to other ECG analysis algorithms, no morphologic features were extracted; rather the entire signal was used by the network in an unsupervised manner. Subsequently, 100 randomly selected patients with multiple ECGs over the course of decades were identified to assess within-individual accuracy of ECG age estimation. Demographic and clinical data were extracted.

Of the 275,056 patients tested, 52% were males and mean age was 58.6±16.2 years. For gender classification, the model obtained 90.4% classification accuracy with an AUC of 0.97 in the independent test data. Age was estimated as a continuous variable with an average error of 6.9±5.6 years (R-squared=0.7). Amongst the 100 patients with multiple ECGs over the course of at least 2 decades of life, most patients (51%) had an average error between real age and ECG age of <7 years. Major factors that were seen amongst patients with an ECG estimated age that exceeded chronologic age by >7 years included: low ejection fraction, hypertension, and coronary disease (p<0.01). In the 27% of patients where their correlation was >0.8 between ECG age and chronologic age, no incident events occurred over the follow-up period (33±12 years).
Data Sources and Study Population
We identified 774,783 adult patients (18 years or older) with at least one digital, standard 10-second 12-lead ECG acquired in the supine position between January 1994 and February 2017. Data was collected from the Mayo Clinic digital data vault, with institutional review board (IRB) approval. For patients with multiple ECGs, only the earliest ECG was selected.

ECGs were acquired at a sampling rate of 500 Hz using a GE-Marquette ECG machine (Marquette, WI) and stored using the MUSE data management system.
Overview of AI Model Development
A convolutional neural network (CNN) was implemented using the KERAS FRAMEWORK with a TENSORFLOW (GOOGLE, Mountain View, CA) backend and PYTHON. While CNNs are typically applied to images, for this study, the network architecture was adapted to include both spatial and temporal feature extraction layers. In general, the network operates by adjusting the weights of the convolutional filters during training to extract meaningful and relevant features in an unsupervised manner. Separate gender and age estimation neural networks were built using stacked blocks of convolutional, max pooling and batch normalization; each block was followed by a non-linear activation function. After the first group of blocks extracted temporal features, another spatial block was employed to fuse data from all leads and then the extracted features were used in a fully connected network. The difference between the age and gender networks was in the output layer. The gender detection network had two outputs (male and female) and was activated with a Softmax output, while the age network had a single output (age) as continuous number, without a following non-linear function (linear activation). Although the same data for training both the gender and age networks, the networks were nonetheless trained separately, but with the same data split for training, validation and testing sets.
Datasets for Developing and Testing the Network
ECGs have some biometric features that can be learned in the process of training the network. To avoid cross contamination of the training and testing datasets only a single ECG per patient was used. After an initial split into the development (64% of the population) and holdout (36% of the population) datasets, the development dataset was further divided into training (75% of the development set) and internal validation data (25%). The training and validation sets were mutually exclusive with respect to patient identification. For training both networks, ECGs were fed to the network and the network weights were optimized using the Adam optimizer with categorical cross entropy as the loss function for the gender network and mean squared error for the age network. The internal validation dataset was used to select the optimal model and hyper parameters and to find the optimal threshold for gender classification.
Models Evaluation and Statistical Methods
Separate models for gender and age were tested using the same holdout dataset. The gender network is a binary classifier (male vs. female), so the model output is the probability that the ECG was obtained from a male— denoted as P. The output P is a continuous number in the range 0 to 1, and in cases of inconclusive ECG-gender discrimination, P will be closer to 0.5. Due to the non linear nature of the network and the uneven number of male and female ECGs used for training, a trivial threshold of 0.5, meaning P>0.5 implies male, may not be the optimal threshold to maximize classification accuracy for males and females. To address this, an ROC analysis was performed using P as the linear discriminator to estimate the AUC and accuracy at various candidate thresholds. An optimal threshold was selected using Youden's J index on the internal validation dataset, and uncertainty in classification was evaluated using the output probability P to analyze whether the model could evaluate its own classification results by rejecting samples with low certainty. For the age estimation network, the network output was an estimate for age based on the ECG as an input. The R square metric and the mean average error metric (MAE) was used to evaluate the network.

Estimation of ECG Estimated Age Over Time and Impact of Clinical Variables

Amongst the data set, a process was developed to extract a set of patients with multiple ECGs recorded over a minimum 2 decades of life was created, and from the extracted set 100 patients were randomly selected. All ECGs at every chronologic year of life were evaluated using the trained network for age and ECG estimated age was plotted against the chronologic age at which that ECG was obtained. If multiple ECGs were obtained at any year of life, the median age was used. After this, clinical histories for patients were extracted via chart review. Clinical comorbidities including prior history of myocardial infarction, low ejection fraction, coronary disease, hypertension, diabetes, atrial arrhythmias, and prior history of cardiac surgery were included. In addition, incident events over the follow-up period including hospitalization for hemodynamic shock, incident cancer, incident comorbidities that were first diagnosed over the follow up period, new diagnoses of coronary disease, heart failure, or thromboembolic events, and cardiac transplantation were recorded. The R-squared correlation values between ECG estimated and chronologic age were then calculated per patient and effect of prior comorbidities and/or incident events on the R-squared or differences between ECG estimated and chronologic age were determined. In order to compare impact of pre-existing comorbidities on deviation of ECG estimated age from chronologic age over time, the mean deviation of ECG estimated age from chronologic age was calculated over the course of the follow-up period. The frequency of specific comorbidities amongst patients whose ECG estimated exceeded the chronologic age by greater than 7 years, was within 7 years of the chronologic age, or was less than the chronologic age by 7 years was recorded. Chi-squared analysis was used to determine whether frequency of comorbidities was significantly different between groups. P<0.01 was considered significant.

Results

Study Population

A total of 774,783 patients with ECG were evaluated. The first ECG was used for developing and testing the model. Patients' mean age was 58.6±16.2 and 52% were male. In the development set, 399,750 unique patients' ECGs were in the training set, and 99,977 in the internal validation set. The remaining 275,056 ECGs were in the holdout testing set.

Gender Classification

Figure 10:
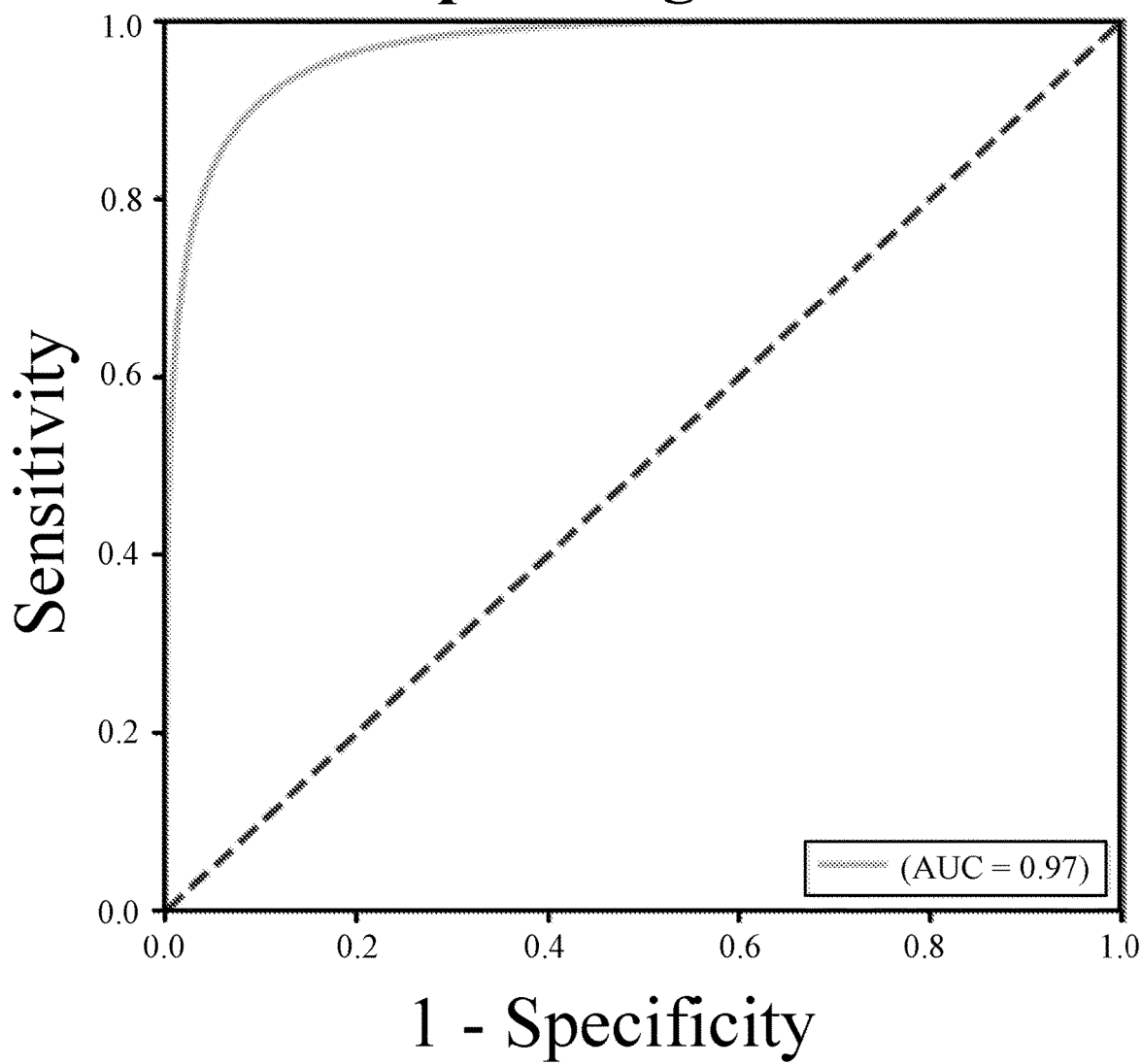
FIG. 10 is a plot pertaining to the first example study depicting receiver operating characteristic (ROC) curve for gender classification in the validation set. Overall area under the curve (AUC) was 0.97.

All the ECGs in the internal validation set and in the holdout dataset were tested using the network. The algorithm output probability for each ECG was obtained and ROC analysis was performed. The AUC of the holdout dataset was 0.968 versus an AUC of 0.973 on the internal validation dataset (FIG. 10). Using the cut-point based on Youden's J index calculated on the internal validation set (Y=0.517), the overall accuracy was 90.4% (90.6% for males and 90.3% for females).

After rejecting the 10% ECGs with intermediate P values (0.31<P<0.69), which suggested an inability to differentiate male versus female for the given ECG (seen in about 10% of all ECGs), the accuracy of the classification improved to 94.3%. When applying the same technique wherein P values between 0.17 and 0.83 were excluded (accounting for 20% of all ECGs), accuracy improved even further to 96.8%. These findings suggest the classifier certainty can be derived from the output probability.

When testing the classifier in a younger population (<45 years of age), the overall accuracy for gender identification was 93% versus 89% in patients older than 55.

Age Estimation

Figure 11:
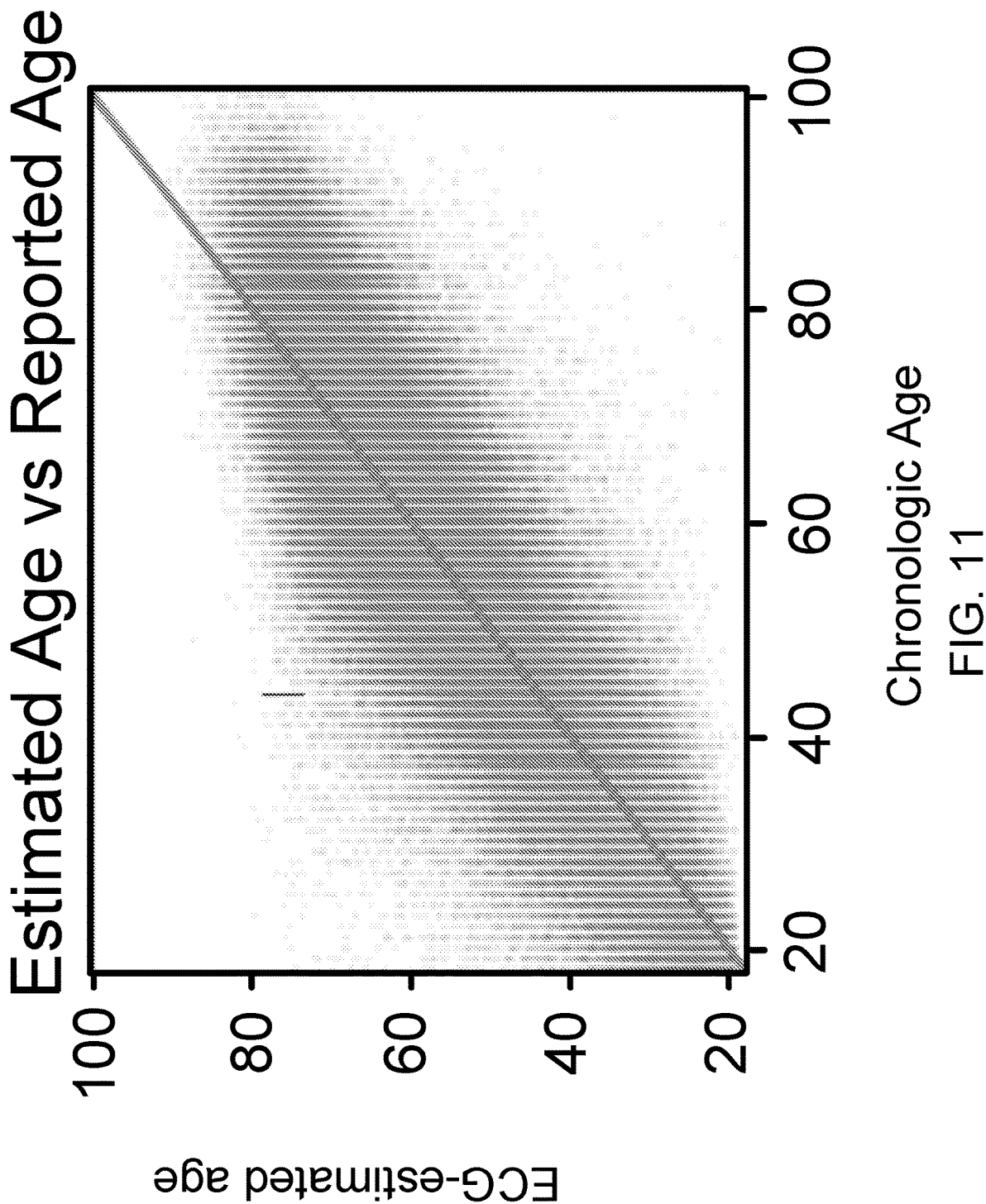
FIG. 11 is a plot pertaining to the first example study depicting estimated age versus reported age (e.g., chronologic age). Shown is the estimated ECG age versus the reported chronologic age. The model R squared was 0.7 with a Pearson correlation of R=0.837.

As the output of the age estimation network was a continuous variable, the statistics of the absolute error were calculated together with the overall correlation and the explained variance (R squared). For the hold out dataset the mean absolute error was 6.9±5.6 years and R squared of 0.7 (R=0.837, P<0.0001). A scatter plot with chronologic age versus ECG-estimated age is presented in FIG. 11.

When supplying the network the results of the gender network and the real gender of the patient, for the 10% of patients where reported gender did not match gender estimation, the R squared for age estimation decreased to 0.62 (r=0.78, P<0.00001) even though the networks were trained separately.

Change in ECG-Estimated Age Over Time

Figure 12:
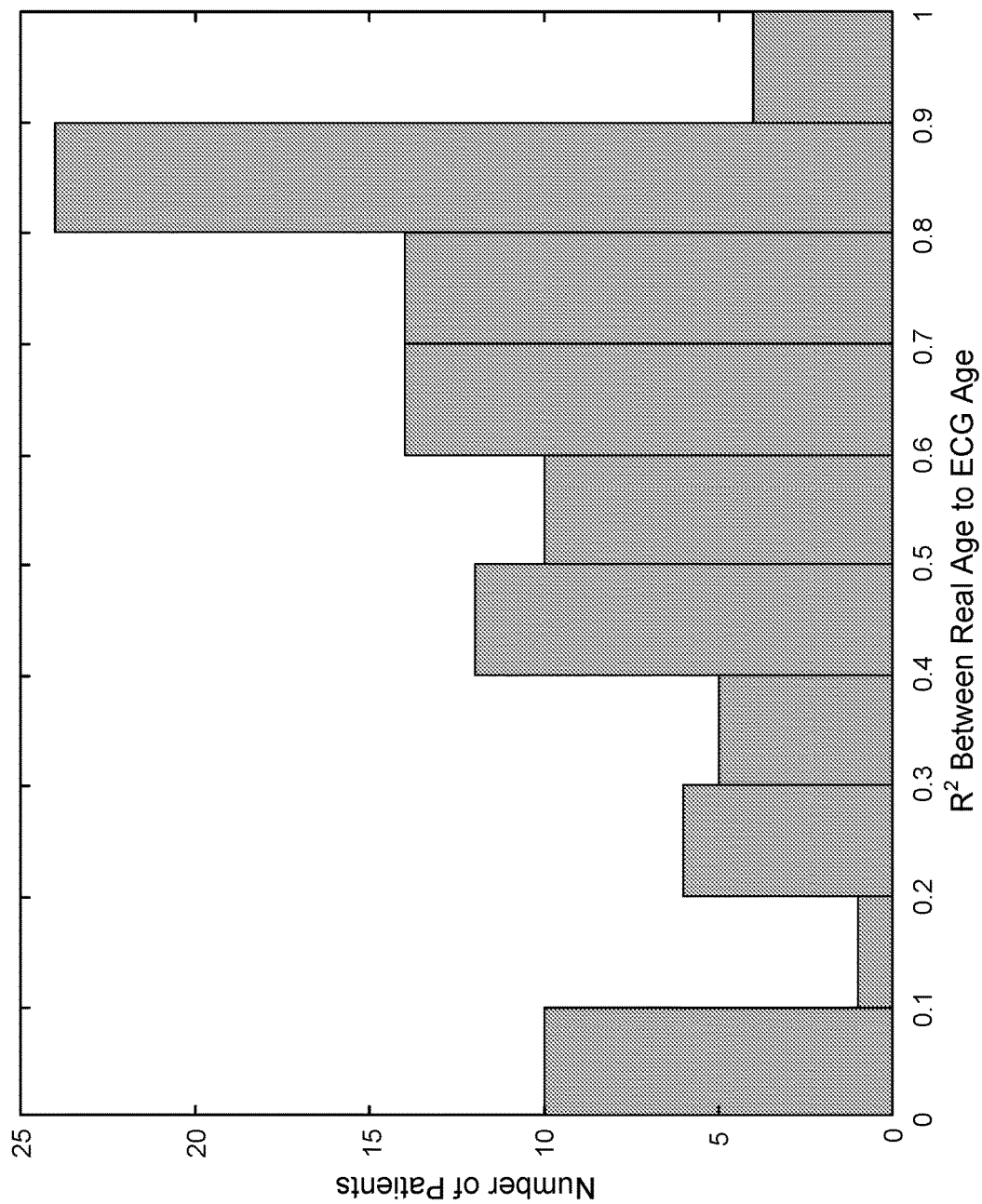
FIG. 12 is a plot pertaining to the first example study depicting R-squared distribution for correlation between ECG estimated age and chronologic age. Shown is the distribution of the number of patients with specific R-squared values correlating ECG estimated age with chronologic age. Higher R squared values suggest a closer linear correlation between ages while low R squared values suggest poor correlation over time.
Figure 13:
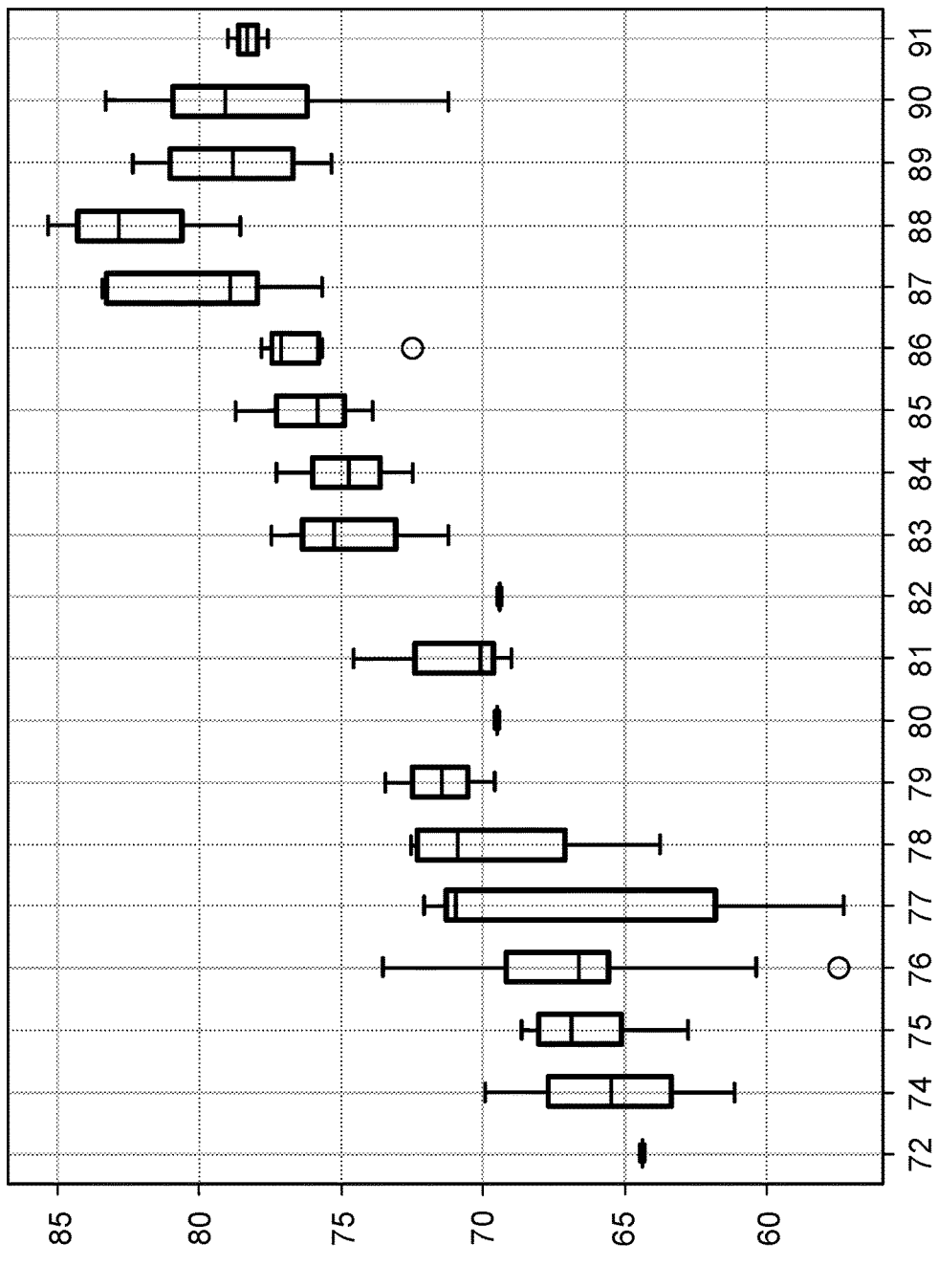
FIG. 13 is a plot pertaining to the first example study depicting correlation between ECG estimated age and chronologic age in an ostensibly healthy male. Shown is the correlation of ECG-estimated age with chronologic age at every year of life in an otherwise healthy patient. The ECG age is younger than the chronological age, and the slope is less than one, suggesting health and slow physiologic aging.
Figure 14:
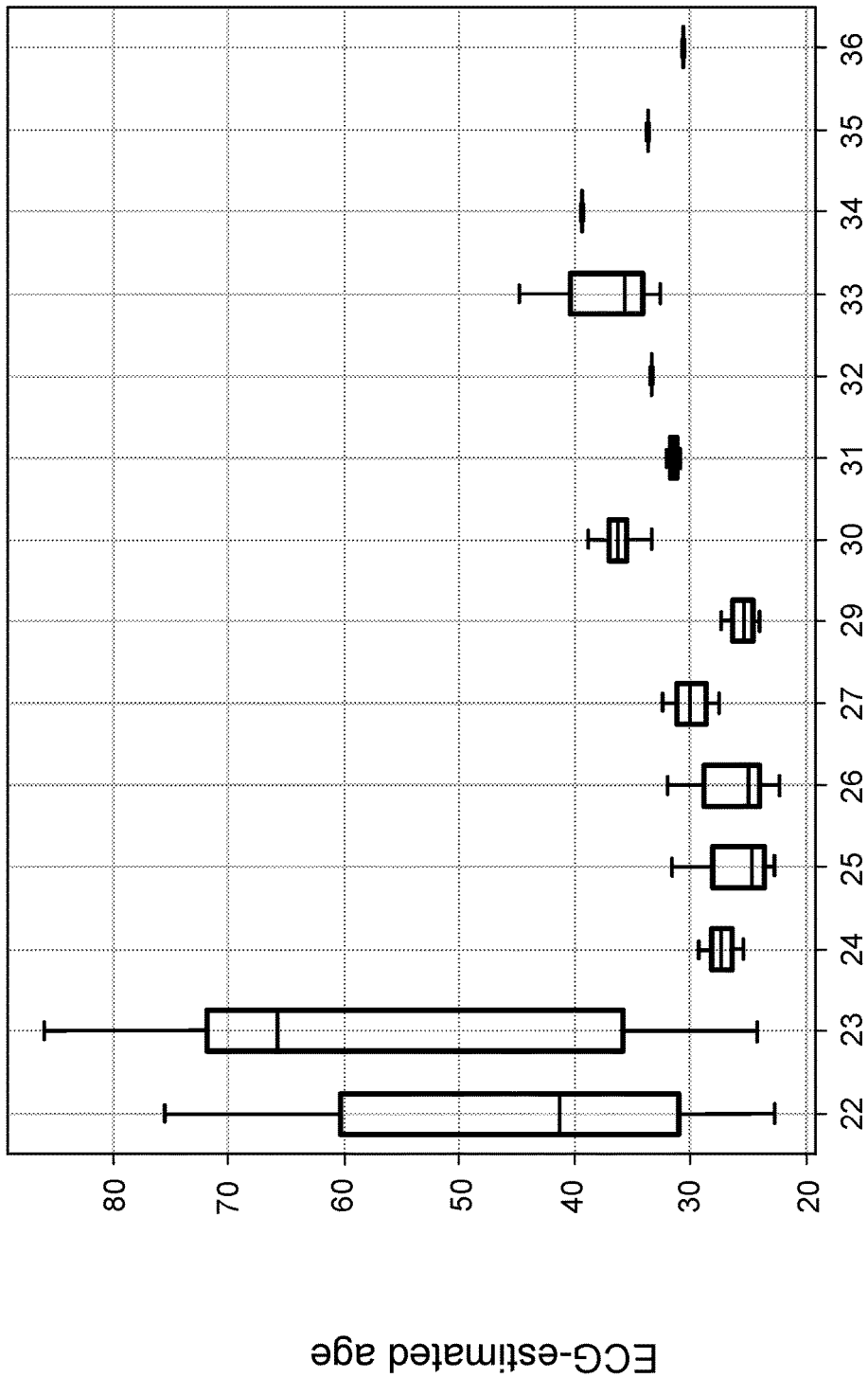
FIG. 14 is a plot pertaining to the first example study depicting correlation between ECG estimated age and chronologic age in a woman with pulmonary hypertension with incident major hospitalizations. Shown is the correlation between ages at every year of life in a woman with chronic pulmonary hypertension. She was chronically managed with beta-blockers but developed supraventricular tachycardia (SVT) and acute pulmonary embolus (PE) at age 22. In the second year she developed acute cardiogenic and hemodynamic shock due to endocarditis and acute right ventricular failure. Thereafter, she was well controlled on medications for her pulmonary hypertension without further major incident events. With stabilization of her medical condition her ECG age dropped and matched her chronological age after age 23.
Figure 15:
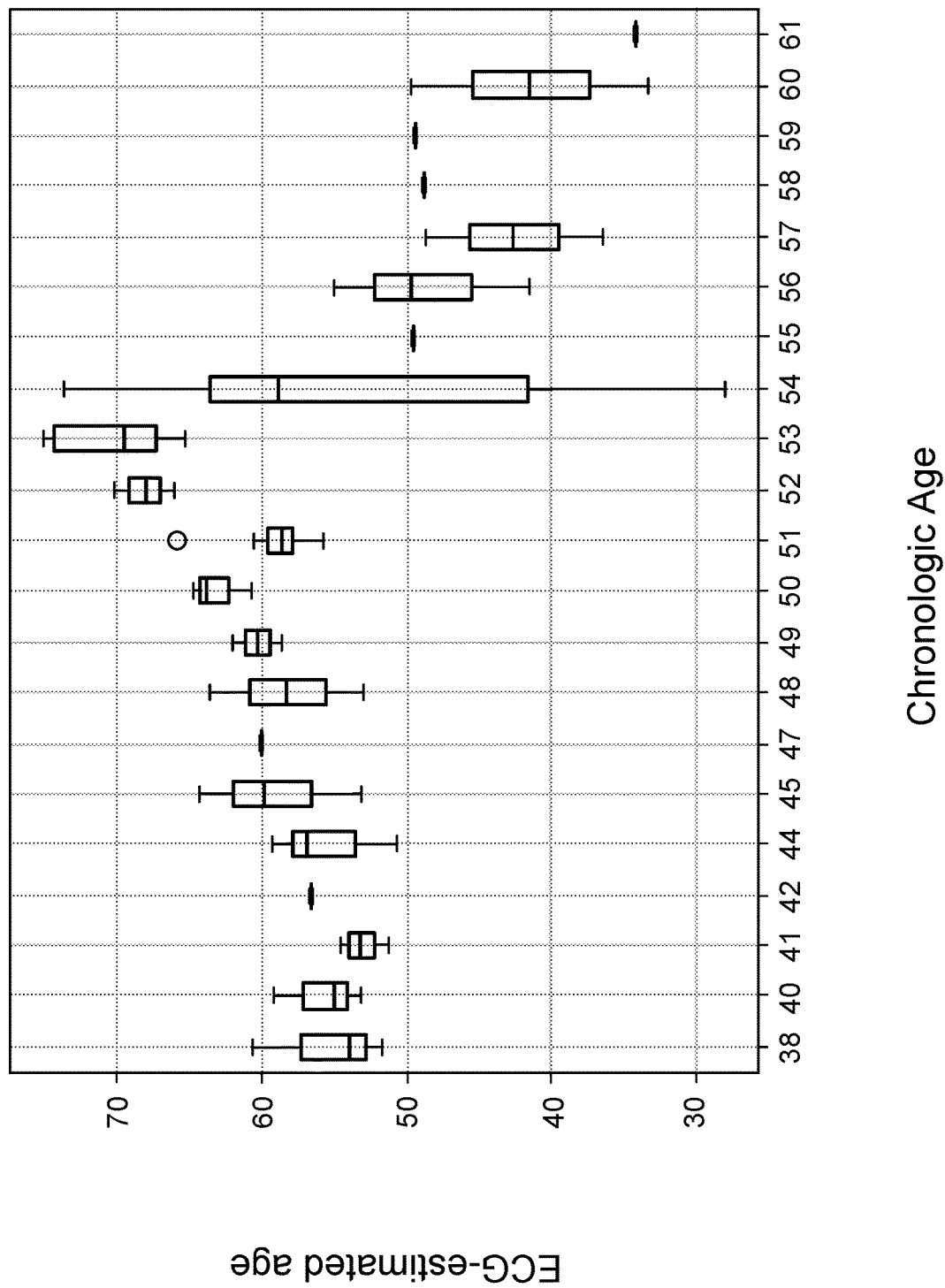
FIG. 15 is a plot pertaining to the first example study depicting correlation between ECG estimated age and chronologic age in a man with multiple incident myocardial infarctions, low EF (ejection fraction), and eventual cardiac transplant. The patient had coronary disease and one prior infarction prior to initial visit at the age of 38 years, at which time ECG estimated age was in the 50s. At age 51, he had another myocardial infarction and developed a low EF with subsequent increase in ECG estimated age to 68 years. At age 54, he underwent a heart transplant from a donor who died at the age of 16, with subsequent decrease in ECG estimated age to 50 years. He remained well for several years with subsequent loss of weight to normal weight and cessation of blood pressure and diabetes medications at the age of 60, with further drop in ECG estimated age to below chronologic age.

For the 100 patients with longitudinal data, FIG. 12 shows the numbers of patients with specific R-squared values between ECG estimated age and chronologic age over the course of a minimum 20 year follow-up time span. The plurality of patients (N=24) had an R-squared value of 0.8-0.9 with 4 patients having an R-squared 0.9-1.0. Amongst patients with an R-squared value of 0.9-1.0, all had no significant medical comorbidities and were otherwise healthy, obtaining ECGs only for general physical examinations, executive physical examinations, or for routine non-cardiac orthopedic or minor surgical procedures (FIG. 13 presents one patient example of this). These patients all had minimal difference between ECG estimated age and chronological age (±7 years). Several patients (N=17) had R-squared values of ≤0.3. Amongst these patients, multiple incident events including new onset low ejection fraction, incident myocardial infarction, new onset hypertension and diabetes, cardiac transplantation and major events such as hemodynamic shock occurred over the follow up period, resulting in major deviations from chronologic age during the year in which the events occurred. (FIG. 15 presents one patient example of this) In most of these patients, with stabilization from the incident clinical insult, ECG estimated age again approximated chronologic age. (FIG. 14)

In patients with ECG estimated age having a deviation from chronologic age of more than 7 years on average, there was a higher incidence of pre-existing comorbidities including prior diagnoses of myocardial infarction, low ejection fraction, coronary disease, hypertension, and atrial fibrillation. (p<0.01) (FIG. 9). In one patient of interest, ECG estimated age exceeded chronologic age for most of the follow-up period, but after subsequent cardiac transplant, ECG estimated age decreased but was still greater than the age of the donor. After a period of weight loss with improvement in other comorbidities including hypertension and diabetes, the patient's ECG estimated age further decreased closer to the donor age and, in fact, to less than the patient's chronologic age. (FIG. 15)

Discussion

This study demonstrates that the ECG age appears to reflect changes in health status. This suggests that physiologic age is distinct from chronological age, and may have useful clinical applications.

Patients in whom the neural network was unable to accurately predict gender also had a higher likelihood of inaccurate age prediction. These might suggest certain features of the ECG that are relevant to both analyses. In chart review of a random selection of patients, several clinical factors associated with mortality including myocardial infarction, low ejection fraction, and coronary artery disease, appeared to correlate with deviations between ECG estimated age and chronologic age. This may account for some differences between ECG-estimated and chronologic age, and supports the notion that ECG age can prove a useful marker for physiologic age. The higher incidence of these diseases with older age might also explain the corresponding differences in gender estimation as gender identification was more accurate in younger than older patients. Additionally, given that older women are more likely post-menopausal, changes in hormone levels may result in greater difficulty for the neural network to differentiate men from women. It is well recognized that circulating sex hormones may impact ECG characteristics. However, hormonal status or biological sex could not be accounted for in our population (only reported gender identity as male or female). Thus, there may have been factors in individual patients (e.g., hormone therapy, sex reassignment, incident diseases, etc.) that may have resulted in inaccuracy of gender or age assignment by the neural network. Further work is needed to better understand the nature of these outliers.

This study demonstrates that by applying AI and machine-learning techniques as described herein to the ECG, it is feasible to accurately extract gender and age in most individuals. Furthermore, the system can provide the user with a certainty value regarding its categorization of an individual to a specific gender that correlates with accuracy of gender identity.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
   recording, using an electrocardiogram (ECG) recorder, an electrocardiogram (ECG) of a mammal;
   obtaining an indication of a chronologic age of the mammal;
   processing, using a computing device comprising at least a processor and a memory communicatively connected to the at least a processor, data representing the ECG of the mammal to generate:
      an estimated age of the mammal, wherein generating the estimated age of the mammal comprises:
         training an age-estimation neural network using a plurality of training examples, wherein the plurality of training examples comprises a plurality of ECG of mammals as inputs correlated to examples of the estimated age of the mammal; and
         generating, by the processor, the estimated age of the mammal using a trained age-estimation neural network, wherein generating the estimated age further comprises:
         generating, by the processor, updated age-estimate neural network parameter values;
         and updating the plurality of training examples as a function of the generated updated age-estimate neural network parameter values;
      and a prediction of a sex of the mammal;
   analyzing, using a training engine, the estimated age and the prediction of the sex of the mammal and comparing them to labels in training examples that indicate target ages and sexes of mammals in a training database, wherein the training engine generates updated model parameter values;
   outputting, using a display device, an indication of the estimated age of the mammal and the prediction of the sex of the mammal;
   comparing, by the processor, the estimated age of the mammal and the chronologic age of the mammal to determine an estimated-chronologic age difference; and based on the estimated-chronologic age difference, determining, by the processor, whether to invoke a second ECG-based estimation process using the ECG of the mammal based on a pre-defined threshold, wherein the second ECG-based estimation process includes providing data representing the ECG of the mammal to a model that is trained to predict a second attribute of the mammal from the data representing the ECG of the mammal, the second attribute being different from the age of the mammal comprising a cardiac ejection fraction of the mammal.

2. The method of claim 1, wherein the age-estimation neural network is a convolutional neural network.

3. The method of claim 2, wherein the convolutional neural network includes spatial and temporal extraction layers.

4. The method of claim 1, wherein the data representing the ECG of the mammal is a fixed-length representation of the ECG for one or more ECG channels.

5. The method of claim 4, wherein the data representing the ECG of the mammal includes a plurality of ECG channels, including the one or more ECG channels, each ECG channel containing measurements for a corresponding lead of the ECG.

6. The method of claim 1, further comprising, in response to determining that the estimated-chronologic age difference meets the pre-defined threshold, generating an alert that flags the estimated-chronologic age difference.

7. The method of claim 6, wherein the alert is to prompt a user to check a setup of an ECG recording system that was used to obtain the ECG of the mammal.

8. The method of claim 1, wherein the second attribute further includes a level of an analyte in a bloodstream of the mammal, or an arrhythmia condition of the mammal.

9. The method of claim 1, further comprising in response to determining that the estimated-chronologic age difference does not meet the pre-defined threshold, determining not to invoke the second ECG-based estimation process.

10. The method of claim 1, wherein the ECG of the mammal is a first segment of an ECG of a mammal and the estimated age of the mammal is a first estimated age of the mammal that is based on processing data representing the first segment of the ECG of the mammal, and the method further comprises:

obtaining a second segment of the ECG of the mammal;

processing, with the age-estimation neural network, data representing the second segment of the ECG of the mammal to generate a second estimated age of the mammal;

comparing the first estimated age of the mammal to the chronologic age of the mammal to determine a first estimated-chronologic age difference;

comparing the second estimated age of the mammal to the chronologic age of the mammal to determine a second estimated-chronologic age difference;

discarding the first segment of the ECG of the mammal based on the first estimated-chronologic age difference, so that the first segment is not used in a second ECG-based estimation process; and providing the second segment of the ECG of the mammal for use in the second ECG-based estimation process based on the second estimated-chronologic age difference.

11. The method of claim 1, further comprising processing, with the age-estimation neural network, the data representing the ECG of the mammal to generate a confidence score that indicates a level of confidence in the estimated age of the mammal.

12. The method of claim 1, wherein processing the data representing the ECG of the mammal to generate the estimated age of the mammal comprises processing only the data representing the ECG of the mammal to generate the estimated age of the mammal, so that the estimated age of the mammal is determined based on the data representing the ECG of the mammal and independent of other information about the mammal.

13. The method of claim 1, wherein the data representing the ECG of the mammal comprises at least one of (i) values for quantized samples of the ECG of the mammal over a period of time or (ii) values for morphological features of the ECG.

* * * * *